United States Patent Office 3,354,093
Patented Nov. 21, 1967

3,354,093
REMOVAL OF POLYMERIZED MATERIALS
FROM SURFACES
Julius E. Early and Harwell E. Benjamin, Borger, Tex., assignors to Phillips Petroleum Company, a corporation of Delaware
No Drawing. Filed Jan. 15, 1965, Ser. No. 425,953
3 Claims. (Cl. 252—170)

This invention relates to a method and a composition of material for removing polymeric depositions from surfaces.

In the polymerization of an olefin to a polymer, some polymeric material is deposited on the surfaces of the processing equipment with which it comes into contact. Heretofore, mechanical removal such as by scraping, sand blasting, and the like has been resorted to only when the magnitude of this polymeric material deposited on the processing equipment was such that the efficiency of the process was reduced to the absolute minimum tolerable. This was done because mechanical removal is not only extremely time consuming but is also a cause of abnormally rapid wear of the equipment all of which make such cleaning techniques extremely expensive.

Thus, heretofore these polymeric depositions have been treated with various solvents in an attempt to remove same from the processing equipment. However, attempts to remove these deposits by conventional solvents such as aromatics have proved only moderately successful even when employed at or near their boiling points.

It has now been found that the removal of these polymeric depositions by at least one aromatic compound selected from the group consisting of benzene, toluene, ethylbenzene, propylbenzene, and isopropylbenzene can be substantially improved if these solvents are employed with from about 0.05 to about 5, preferably from about 0.1 to about 1 weight percent cyclic ethers containing from 2 to 5 carbon atoms per molecule, preferably tetramethylene oxide, based on the total weight of solvent.

Accordingly, it is an object of this invention to provide a novel composition particularly adapted for the removal of polymeric deposits from surface. It is another object of this invention to provide a method for removing polymeric deposits from surfaces.

Other aspects, objects and the several advantages of the invention will be apparent to those skilled in the art from the description and the appended claims.

According to this invention at least one aromatic compound selected from the group consisting of benzene, toluene, ethylbenzene, propylbenzene and isopropylbenzene, preferably benzene, toluene, and ethylbenzene, containing the cyclic ethers in quantities set forth above can be utilized as a washing solution intermittently during the use of the processing equipment employed in producing the polymer, including the polymerization reactor, and when so used substantially increases the length of time such processing equipment can be used before mechanical cleaning is necessary. The wash solution can be employed at a temperature and for a time which varies widely and is dependent primarily only on the rate of loosening and/or removal of polymeric deposition desired. Generally, the wash solution temperature can vary from about 80° F. substantially to the boiling point of the solvent employed and can be used for from about 5 to about 60, preferably from about 24 to about 48 hours.

Although the wash solution of this invention can be employed to loosen and/or remove any polymeric deposit which tends to be even slightly soluble in the aromatic solvent employed, the wash solutions of this invention have been found to be particularly effective in removing polymeric depositions formed in the polymerization of dienes, preferably conjugated dienes, having from 4 to 6 carbon atoms per molecule. Such dienes include butadiene, isoprene, piperylene, and the like, preferably butadiene. A full and complete disclosure of polymerizing conditions, catalysts and the like is found in copending applications, Ser. No. 218,853, filed Aug. 23, 1962, and Ser. No. 721,293, filed Mar. 13, 1958, both assigned to the same assignee.

Although the method of this invention is applicable to the loosening and/or removal of polymeric deposits from any type of processing equipment to which they come into contact, it is particularly applicable to batch-type processing equipment since periodically this equipment is emptied of polymer and associated materials and is then available for washing with the solution of this invention. Furthermore, the washing with the solution of this invention can be performed periodically after each or after an arbitrary number of batches of polymer have passed therethrough. By the use of the solutions of this invention periodically, it is possible to significantly increase the number of polymerization runs that can be made before mechanical clean-out is required. In some instances, the wash solution loosens the deposition sufficiently for it to slough off the surface by itself while in other instances it loosens the deposition just enough to facilitate subsequent mechanical removal.

Example I

Polybutadiene having a molecular weight of about 5400 was prepared by polymerizing butadiene in the presence of dilithium stilbene. The reactor employed had a 1000-gallon capacity and a batch process was employed with a run length of about 1.5 hours. After each 30 to 40 runs the reactor, after being emptied of its polymer and related material content, was contacted with toluene at a temperature of about 230° F. for 48 hours. After 160 runs, heat transfer through the tube bundle of the reactor had decreased to the point that it was imperative to shut down, empty the reactor and clean the interior thereof mechanically. The layer of polymeric deposition on the tube bundle had an average thickness of about ¼-inch.

Example II

Polybutadiene was prepared in the same manner as in Example I utilizing a reactor having 1000-gallon capacity and employing a batch process with a run length of about 1.5 hours. After each 30 to 40 runs, the reactor after being emptied of its polymer and associated material content, was contacted with a mixture of toluene and tetramethylene oxide containing about 0.4 weight percent tetramethylene oxide at a temperature of about 230° F. for 48 hours. A total of 169 runs was made before the reactor was shut down for inspection and at that time it was found that the reactor walls and tube bundle were covered with about a ⅛-inch layer of polymeric deposition. This indicated that even though 169 runs had been made a number of additional runs were possible before mechanical cleaning was necessary. The fact that a number of additional runs were possible was verified by the fact that the heat transfer being obtained at the time of shut down and inspection was also sufficiently high as not to then require mechanical cleaning.

Thus, the use of a small amount of tetramethylene oxide in the wash toluene there resulted a substantial increase in the number of polymerization runs possible before mechanical cleaning became necessary.

Reasonable variations and modifications of this invention can be made, or followed, in view of the foregoing, without departing from the spirit or scope thereof.

We claim:
1. A method of removing synthetic rubber polymeric depositions from surfaces, said depositions consisting essentially of conjugated dienes having from 4 to 6 carbon atoms per molecule, said method comprising contacting said depositions with at least one material selected from the group consisting of benzene, toluene, ethylbenzene, propylbenzene and isopropylbenzene and from about 0.05 to about 5 weight percent of tetramethylene oxide based on the total weight of these two materials.

2. A method according to claim 1 wherein from about 0.1 to about 1 weight percent tetramethylene oxide based on the total weight of the mixture is used.

3. A method according to claim 1, wherein a mixture consisting essentially of toluene and from about 0.05 to about 5 weight percent tetramethylene oxide based on the total weight of the mixture is used.

References Cited

UNITED STATES PATENTS

| 2,658,053 | 11/1953 | Signer et al. |
| 2,990,391 | 6/1961 | Grantham _____ 252—364 XR |
| 3,036,025 | 5/1962 | Hutchinson. |

OTHER REFERENCES

The Condensed Chemical Dictionary (1950) (4th edition), Reinhold Pub. Corp., New York (page 653 relied on, copy in Sci. Lib.).

LEON D. ROSDOL, *Primary Examiner.*

SAMUEL H. BLECH, *Examiner.*

J. T. FEDIGAN, *Assistant Examiner.*